United States Patent [19]

Takaoka et al.

[11] 4,382,329
[45] May 10, 1983

[54] TUBE INSERTION MACHINE

[75] Inventors: Nobuo Takaoka, Kakogawa; Kosei Ageta, Kobe, both of Japan

[73] Assignee: Kobe Steel, Ltd., Kobe, Japan

[21] Appl. No.: 180,442

[22] Filed: Aug. 22, 1980

[30] Foreign Application Priority Data

Aug. 24, 1979 [JP] Japan .................................. 54-108416
Aug. 24, 1979 [JP] Japan .................................. 54-108417
Aug. 24, 1979 [JP] Japan .................................. 54-108418

[51] Int. Cl.³ ............................................ B23P 15/26
[52] U.S. Cl. ..................................... 29/726; 414/745; 414/746
[58] Field of Search .................... 254/30; 29/726, 727, 29/157.4, 157.3 C; 414/745, 746

[56] References Cited

U.S. PATENT DOCUMENTS

| 3,193,084 | 7/1965 | Bauer et al. | 414/745 |
| 3,340,850 | 9/1967 | Elliott | 414/745 X |
| 3,406,838 | 10/1968 | Davidson | 414/745 X |
| 3,630,392 | 12/1971 | Cintract | 414/745 |
| 4,221,534 | 9/1980 | Rethy | 29/726 |

Primary Examiner—Francis S. Husar
Assistant Examiner—V. K. Rising
Attorney, Agent, or Firm—Flynn, Thiel, Boutell & Tanis

[57] ABSTRACT

This invention relates to a tube insertion machine, and more particularly to a machine which efficiently inserts heat exchange tubes into holes in opposed end plates and middle plates of shell and tube type heat exchangers.

7 Claims, 21 Drawing Figures

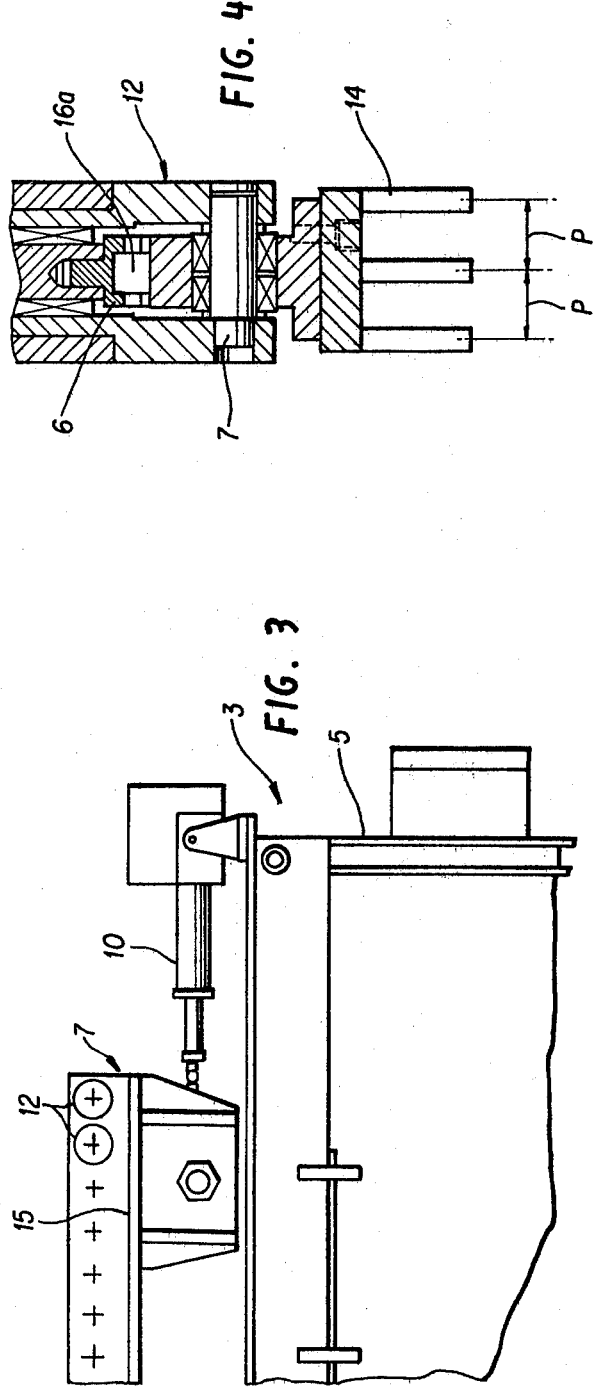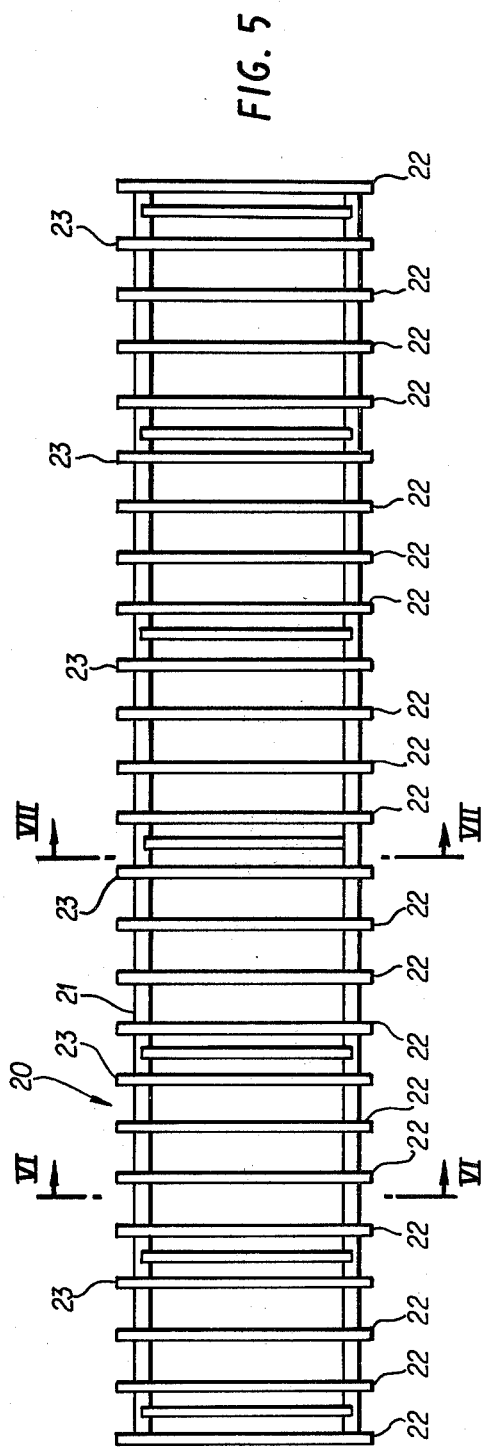

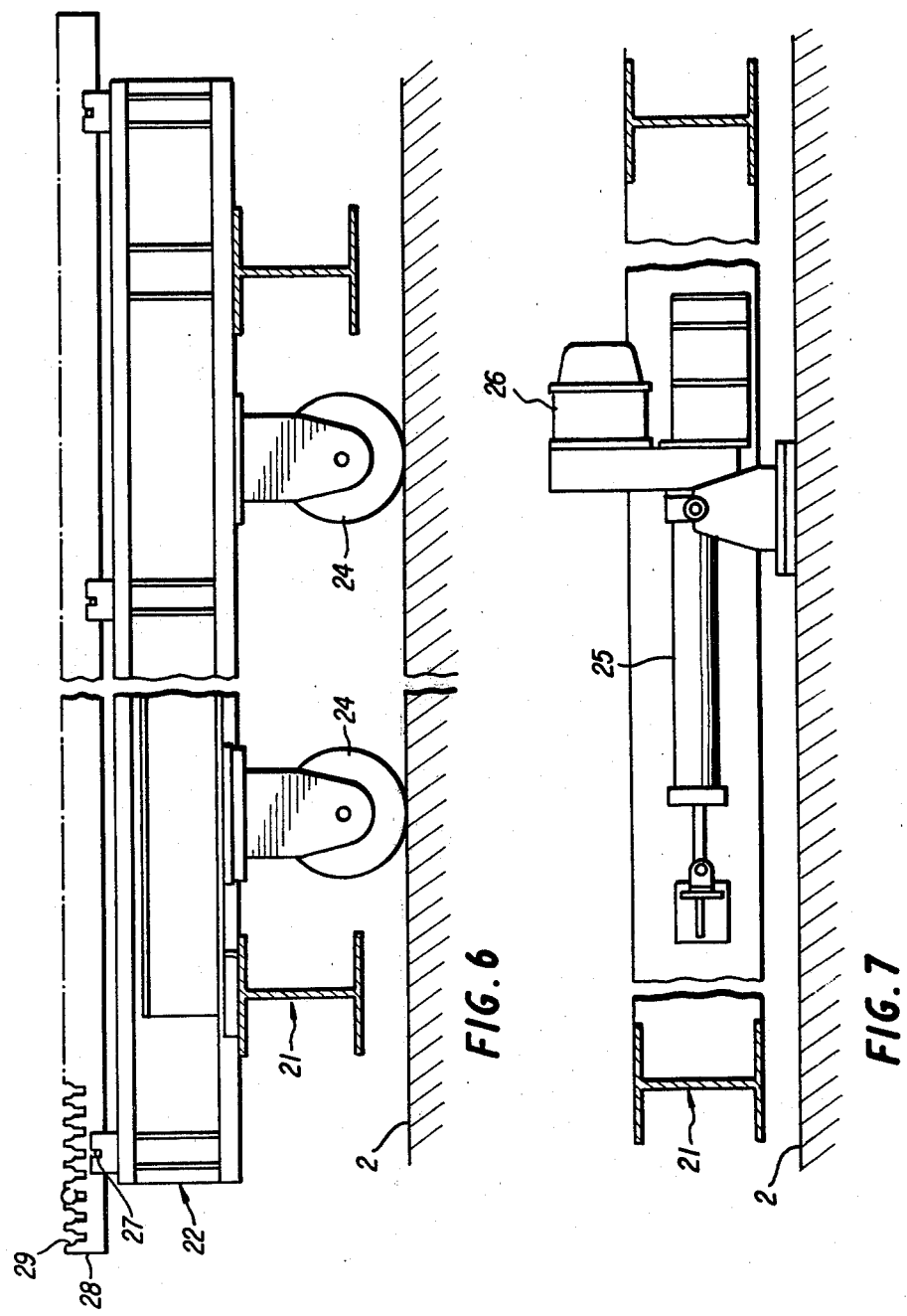

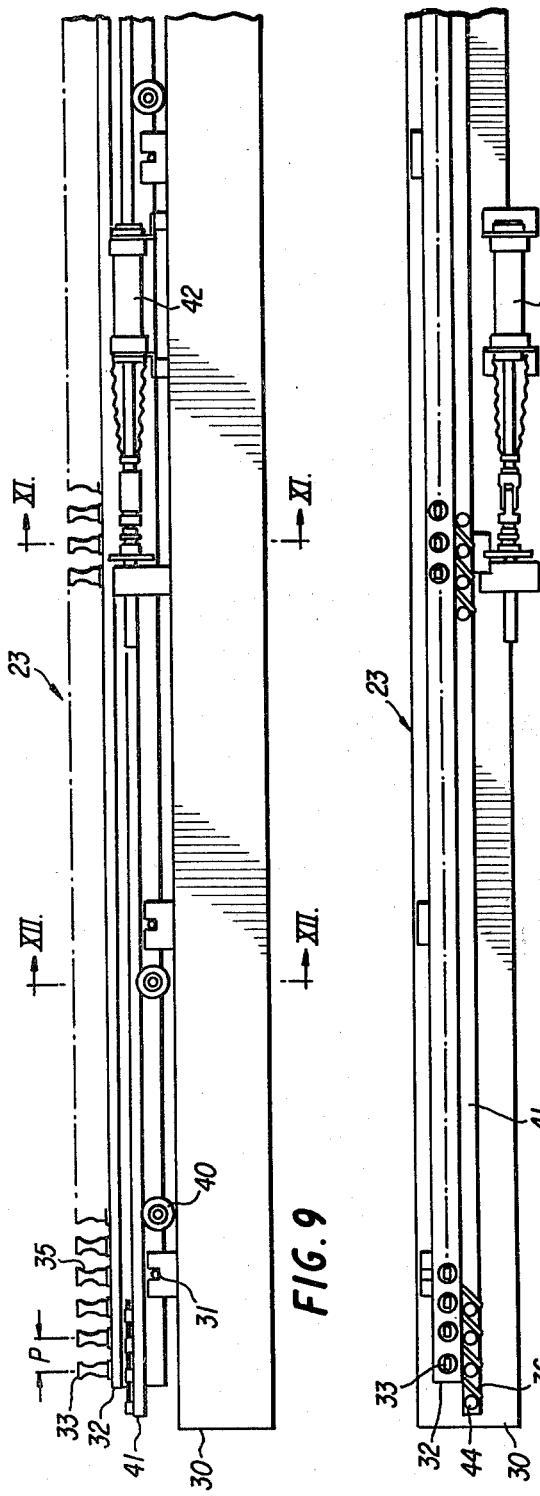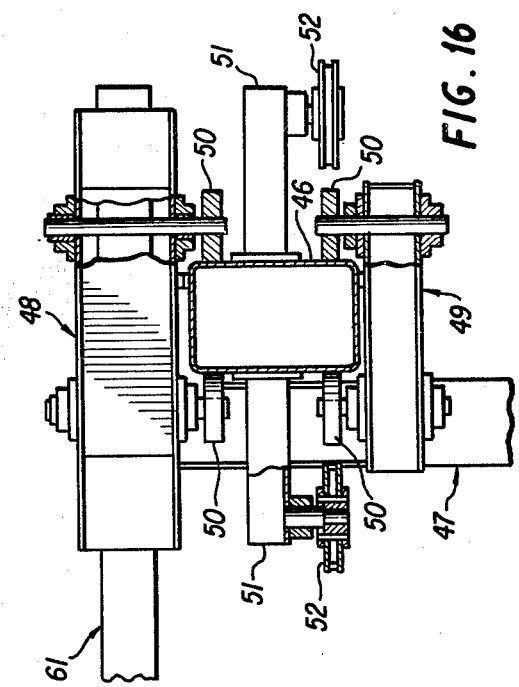

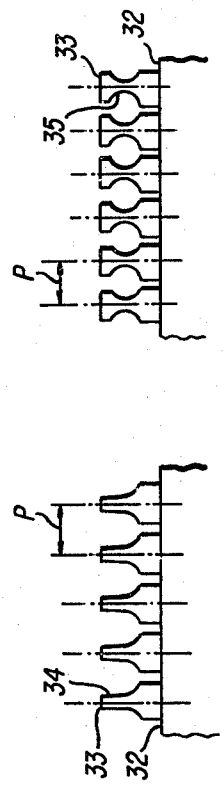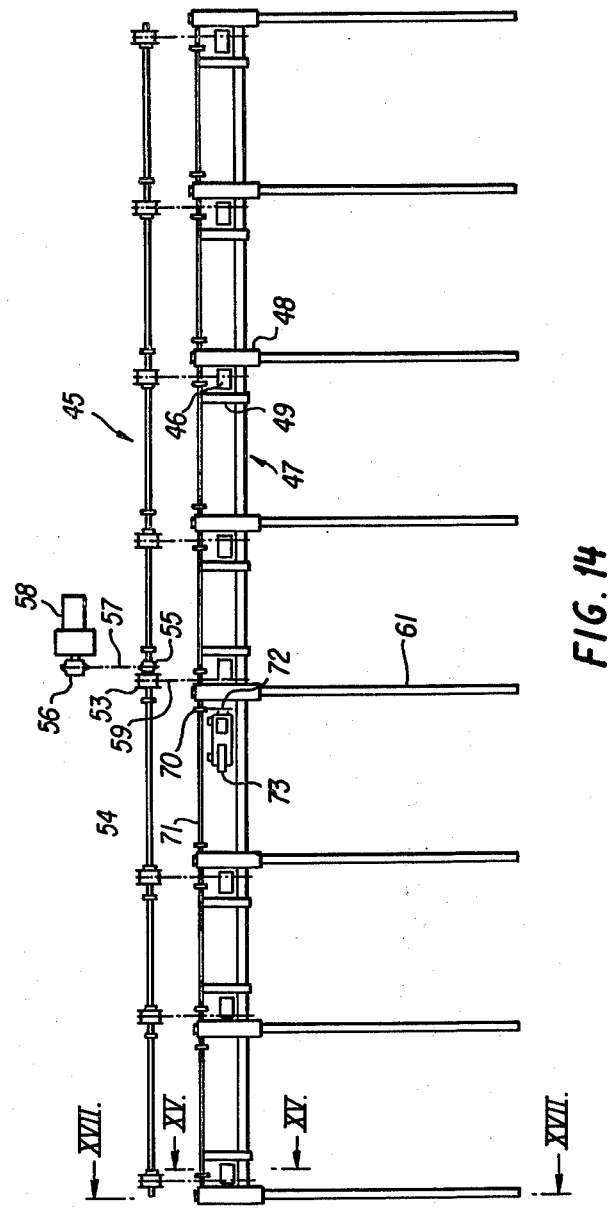

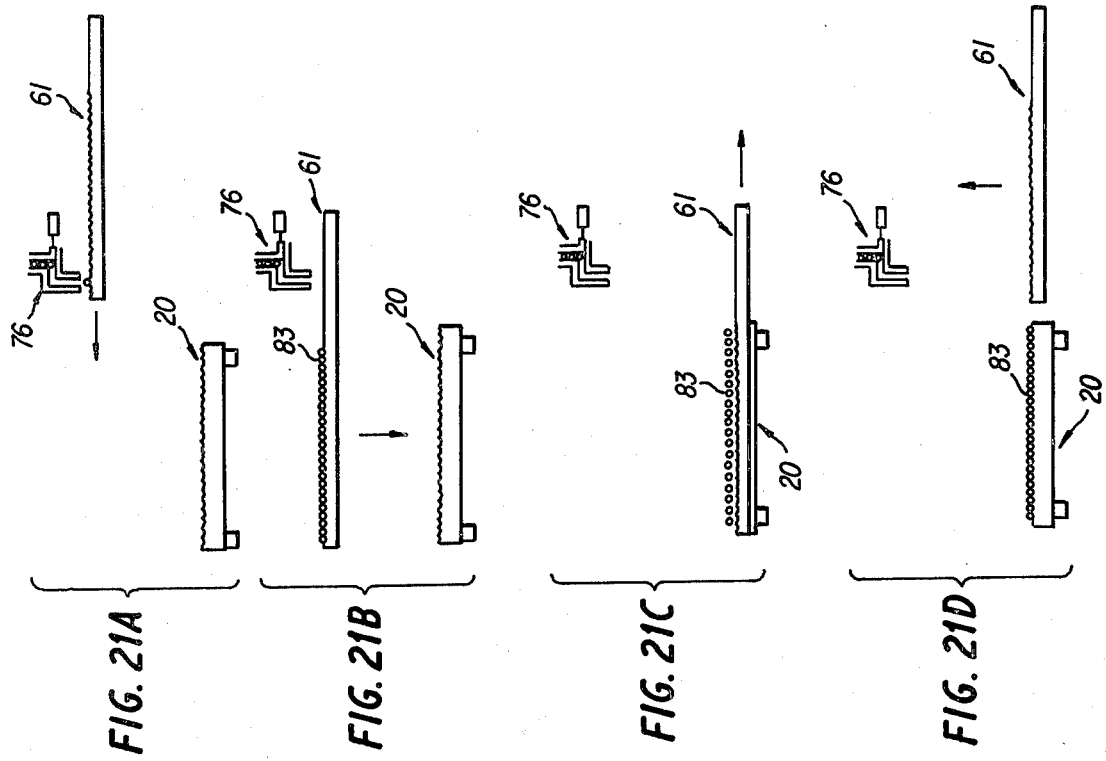
FIG. 21A
FIG. 21B
FIG. 21C
FIG. 21D
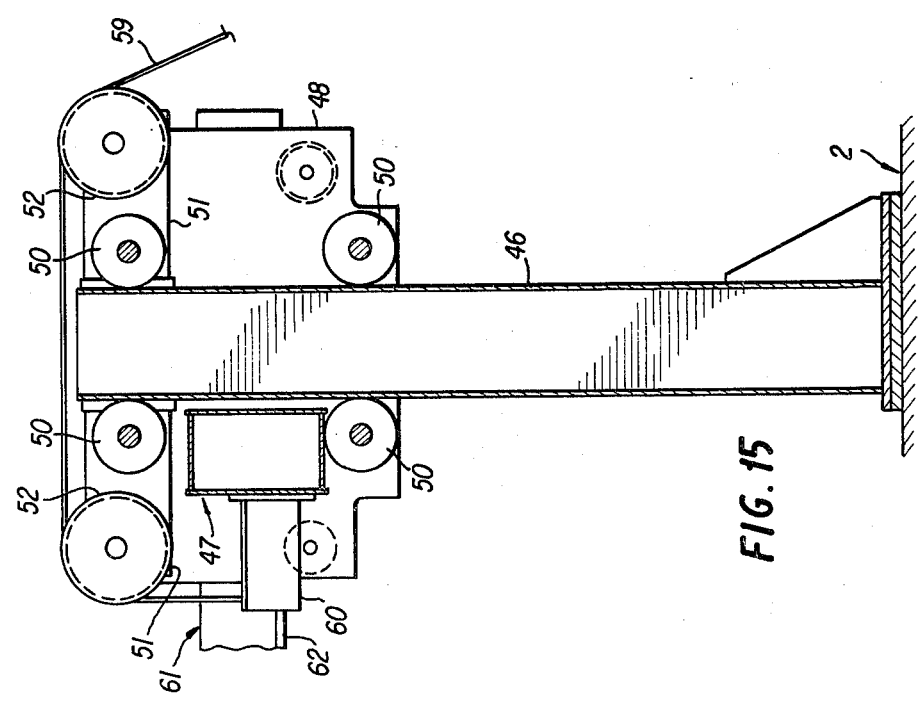
FIG. 15

TUBE INSERTION MACHINE

BACKGROUND OF THE INVENTION

In the past, insertion of tubes into holes in tube plates and middle plates of heat exchangers were assisted mainly by human labor.

The time-honored procedure of tube insertion is therefore low in efficiency and demands a great deal of labor and time especially when thousands of tubes of a few meters long are to be inserted. An automated tube insertion machine has been suggested, for example, in Japanese patent publication No. 16582/1977. Since within the proposed machine the tubes are not conveyed thereto till a tube pusher makes a complete reciprocating movement and the pusher is driven in an interrupted manner, the machine still lacks sufficient efficiency while being more quick to insert the tubes than human labor.

The machine has another problem that, while being guided by way of guide rollers on a support, the tubes are sometimes bent upward out of the guide rollers due to repelling force occurring when any of the tubes is engaged with the holes in the heat exchangers for any reason. Such a problem results in a substantial economic loss in the case where the tubes are made of titanium steel.

SUMMARY OF THE INVENTION

With the foregoing in mind, it is an object of the present invention to provide a tube insertion machine which prevents tubes from being bent upward in operation and allows the tubes to be inserted into tube plates of heat exchangers, etc., with a high degree of efficiency and in a comparatively short period of time by virtue of reciprocating movement of a pusher.

In one distinctive aspect of the present invention, a tube insertion machine comprises a support, a plurality of guides mounted at a predetermined interval on the top of said support for guiding tubes from above and rotatable for preventing the tubes from being bent upward, and a pusher of gate configuration slidable on said support and having a multiplicity of pawls for advancing the tubes on said guides.

Other features of the present invention will be more fully understood from a consideration of the following detailed description.

DESCRIPTION OF THE DRAWINGS

FIG. 3 is a plan view of an essential part of the pusher of gate configuration;

FIG. 4 is an enlarged cross-sectional view of pawls of the gate configuration pusher of FIG. 2;

FIG. 5 is a plan view of a guide station shown in FIG. 1;

FIG. 6 is an enlarged cross-sectional view taken along the line VI—VI in FIG. 5;

FIG. 7 is an enlarged cross-sectional view taken along the line VII—VII in FIG. 5;

FIG. 9 is an enlarged side view of a rotary guide in FIG. 5;

FIG. 10 is a plan view of the rotary guide of FIG. 9;

FIG. 13 is a side view showing guide slits between two adjacent guide bars which move close to each other;

FIG. 14 is a plan view showing an arm portion shown in FIG. 1;

FIG. 15 is an enlarged cross-sectional view on the line XV-XV in FIG. 14;

FIG. 16 is a plan view partly in cross section of the device of FIG. 15;

FIG. 21 is a flow diagram for explanation of the situation where the tubes are conveyed onto the guide station by the use of an arm.

DETAILED DESCRIPTION OF THE PREFERRED EMBODIMENT

Figure 1:
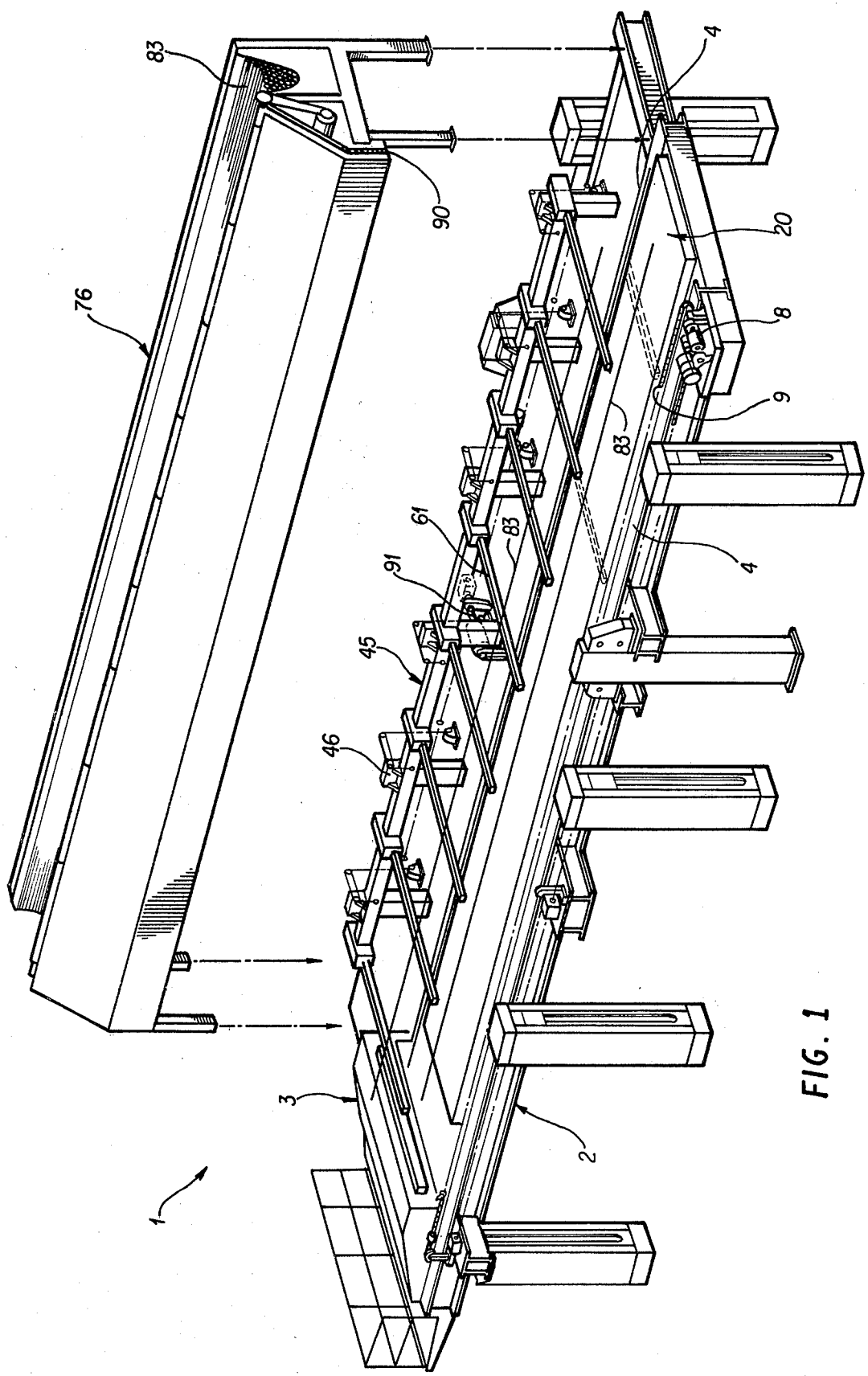
FIG. 1 is a perspective view of a tube insertion machine constructed according to one preferred embodiment of the present invention.

Attention is first invited to FIG. 1 wherein a tube insertion machine constructed according to the present invention and generally designated 1 is shown as comprising an elevator 2, a pusher 3 of gate configuration slidable on the top of the elevator 2, a guide station 20, an arm station 45 and a tube supply station 76. As a rule, tubes from a storage device in the tube supply station 76 are dispensed one by one via an outlet port, with their tips automatically secured by a nose (not shown), and then conveyed and aligned on the top of an arm of the arm station 45 traveling incrementally in a horizontal direction. The aligned tubes 83 are lowered together with the arm and shifted to the top of the underlying guide station 20. Thereafter, the tubes 83 are threaded into holes in the tube plates and middle plates of heat exchangers while being urged by forward movement of the pusher 3 of gate configuration driven by a drive device. It will be noted that transfer of the tubes to the arm station 45 is carried out while the gate configuration pusher 3 is moving forward.

Figure 2:
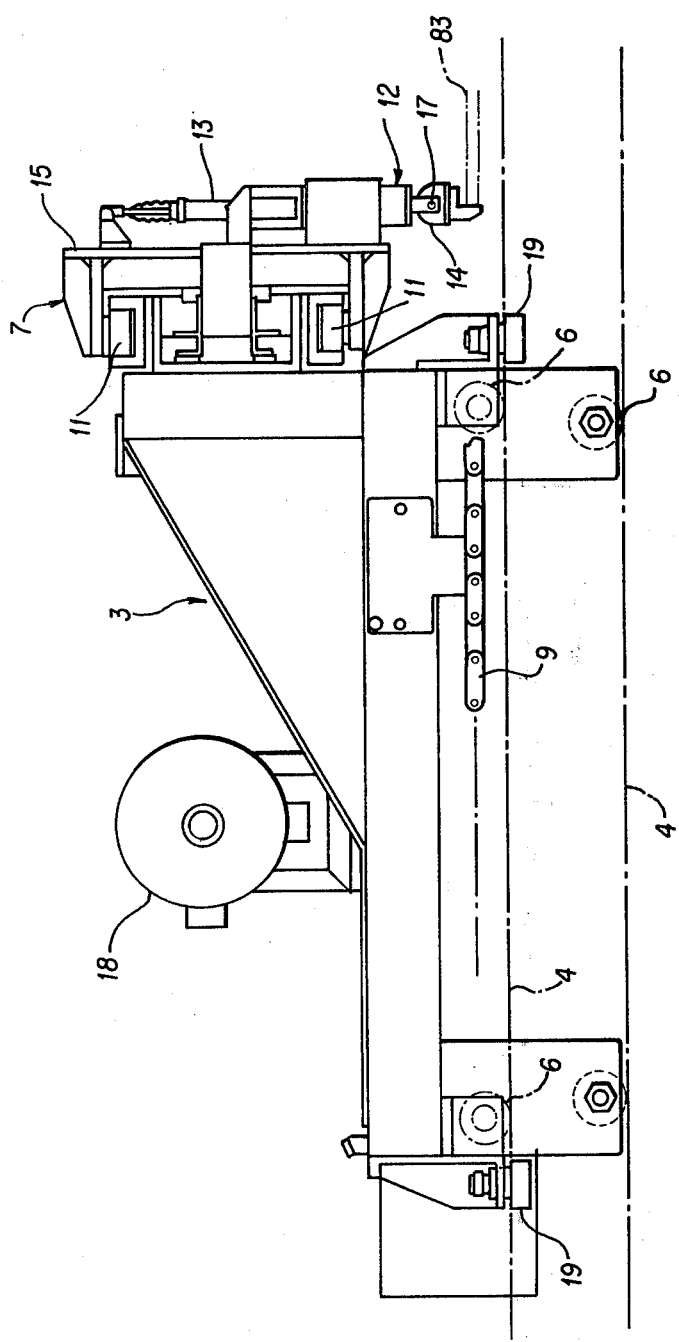
FIG. 2 is a side view of a pusher of gate configuration shown in FIG. 1.

The gate configuration pusher 3, as indicated in FIGS. 2 through 4, comprises a truck 5 with wheels 6 running on rails 4 on the elevator 2 and a thrust head portion 7 and is, as a whole, movable to the left and right in FIG. 1 by way of a chain 9 which is driven by the drive device 8 resting on the top of the elevator 2. If necessary, the drive device 8 may be adapted to select the speed of the gate configuration pusher 3, either high speed or low speed, for example.

The thrust head portion 7 is secured in front of the wheeled truck 5 to be slidable to a slight extent in a horizontal direction, namely, across the width of the elevator 2 by operation of a cylinder 10 via roller 11. The thrust head portion 7 includes a cylinder 13 and a plurality of thrust heads 12 each having a pawl 14 at its extremity. The thrust head members 12 are supported on a mount 15 for the thrust head portion 7 to be movable upward and downward with respect to the cylinder 13 and the pawls 14 are of a three-forked shape in an example of FIG. 4. The pawls 14 are spaced at the same pitch P as the holes are formed in the end plates of the heat exchangers, with a wider width than that of openings in the guide station 20.

Each of the pawls 14 is pivoted about a shaft 17 on the tip of a pressure rod 16 resiliently fitted within the respective thrust head 12, although not shown, and rotated when force of a more than given strength is exerted on the tip of the pawl 14, urging a roller 16a into a recess at the uppermost end of the pawl 14. Such rotation of the pawl 14 is sensed by a sensing means (not shown) which in turn renders the cylinder 13 operative to lift the pawl 14. There are further provided an air tank 18 for actuating the cylinders 10 and 13 and a guide roller 19.

The guide station 20 on the top of the elevator 2, as indicated in FIG. 5, comprises a plurality of parallel stationary guides 22 and a plurality of parallel rotary guides 23 both of which are spaced at a given interval on the top of a rectangular framework 21 and along its width. As is clear from FIGS. 6 and 7, the framework 21 is movable on the top of the elevator 2 via wheels 24 across its width under control of a cylinder 25. A potentiometer 26 attached to the cylinder 25 senses the movement of the framework 21 (the movement of the cylinder 25).

Figure 8:
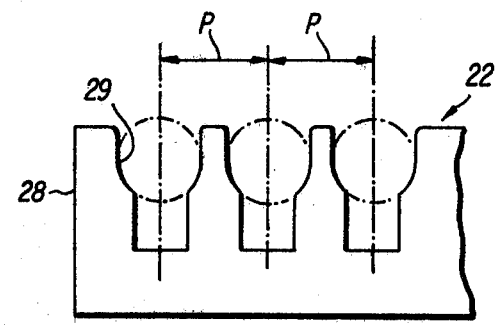
FIG. 8 is an enlarged side view of a guide plate shown in FIG. 6.
Figure 11:
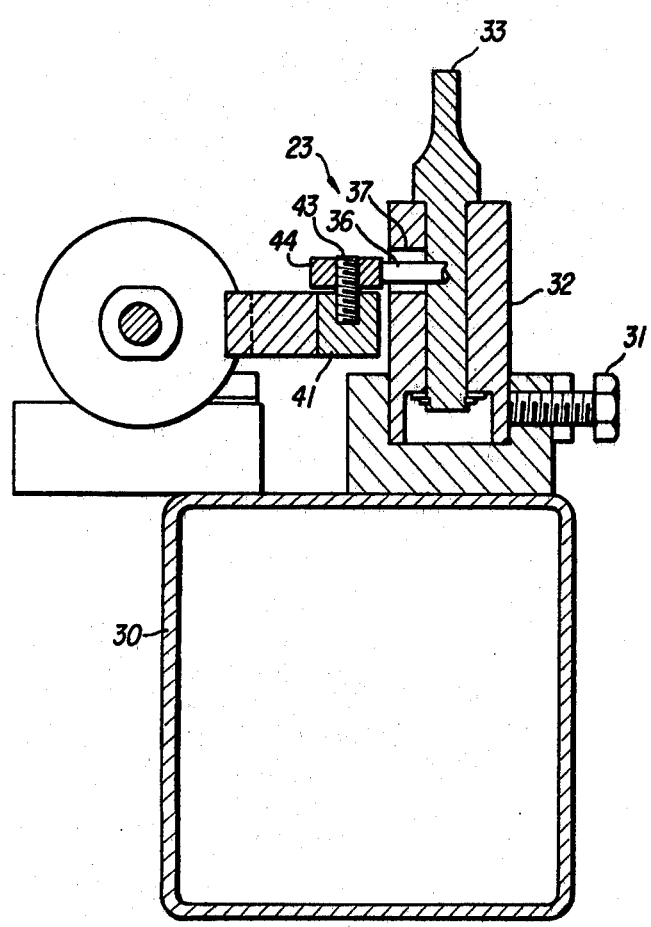
FIG. 11 is an enlarged cross-sectional view taken along the line XI—XI in FIG. 9.

On the top of the stationary guide 22, as indicated in FIGS. 6 and 8, there is detachably installed a guide plate 28 having a multiplicity of grooves spaced at the same pitch P as that of the holes in the end plates of the heat exchangers, through the use of fixing pins 27.

Figure 12:
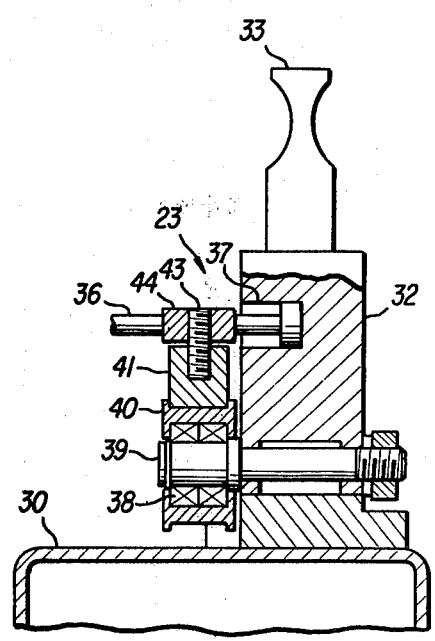
FIG. 12 is an enlarged cross-sectional view on the line XII—XII in FIG. 9.

The rotary guide 23, on the other hand, comprises a detachable guide plate 32 having on its top a multiplicity of rotatable guide rods 33 at the same pitch P as that of the holes in the heat exchangers, the guide rods being bolted as 31 to the top of a tubular frame 30 of a square cross section. As best shown in FIG. 13, there are formed a "U" shaped guide groove 34 between the two adjacent guide rods 33 and a "O" shaped guide groove 35 as viewed when the guide rods 33 make 90° revolution. At the lowest end of each guide rod a horizontally turned rotary pin 36 is provided which has its foremost end extending outward through a groove 37 in a side wall of the guide plate 32. On a side wall of a bottom portion of the guide plate 32, as indicated in FIG. 12, there is secured a roller 40 which is rotatable on a shaft 39 via a bearing 38. A cylinder 42 moves a slide rod 41 of a square cross section in a horizontal direction on the top of the roller 40. Discs 44 are disposed on the top of the slide rod 41 via stud screws 43 at the same pitch P as that of the guide rods 33. Each of the rotary pins 36 secured at the guide rod 33 is interposed between the two adjacent discs 44. The guide rod 33 turns about 90° when the cylinder 42 is driven.

The arm section 45, as depicted in FIGS. 14 through 19, comprises a plurality of links 47 which are movable upward and downward through a plurality of props 46 standing on the elevator 2. Each prop 46 is flanked with an arm guide box 48 and a block portion 49 both of which are mounted on the link 47. Guide rollers 50 are rotatably secured within the arm guide box 48 and the block portion 49 for guiding the links 47. A pair of brackets 51 at both sides of the top of the prop 46 carry pulleys 52 at their tip portions.

As shown in FIG. 14, adjacent the prop 46 there is disposed a driving shaft 54 which keeps a plurality of drums rotatable and is operatively connected to a driving motor 58 via chain wheels 55, 56 and a chain 57. One end of a wire 59 is affixed to the drum 53, with the other end thereof being secured on fittings 60 on one side of the link 47 via a pulley 52 fixed on the prop 46. When the respective drums 53 are rotated by the driving motor 58, the arm station 45 moves upward and downward along the prop 46 together with the wire 59 and the links 47.

Figure 17:
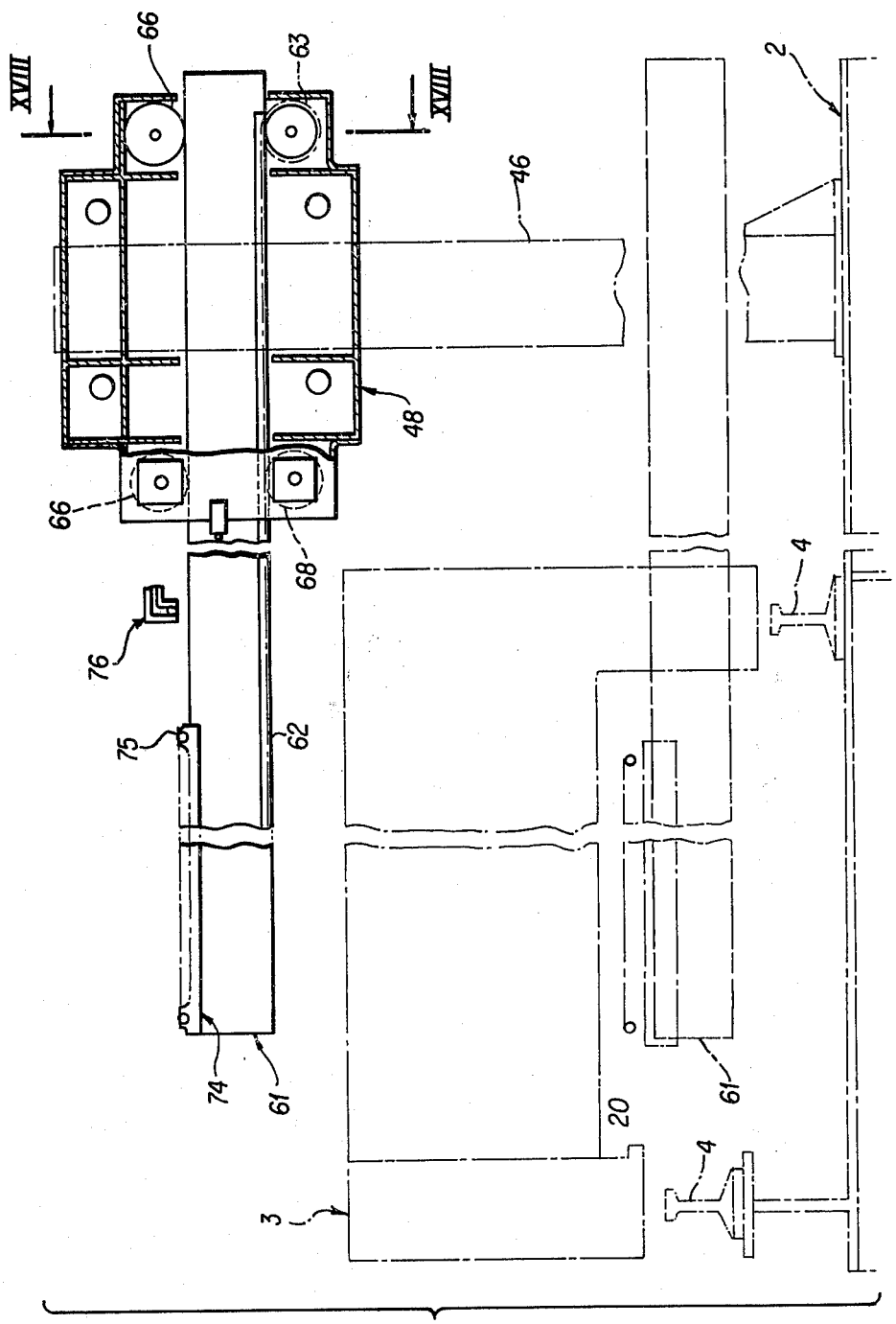
FIG. 17 is an enlarged cross-sectional view on the line XVII—XVII in FIG. 17.
Figure 18:
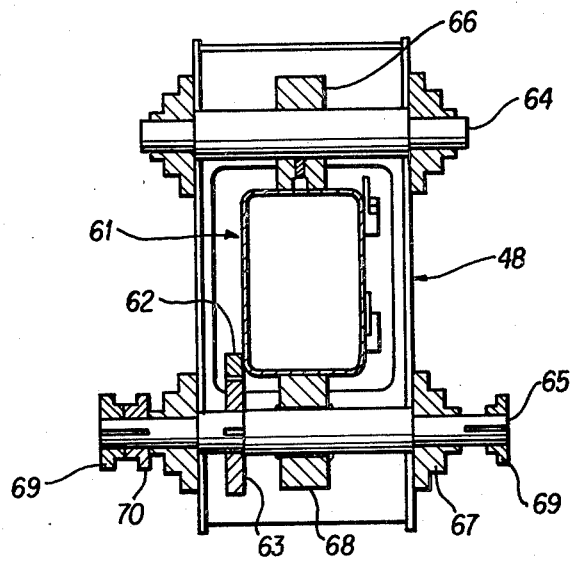
FIG. 18 is a cross-sectional view on the line XVIII—XVIII in FIG. 17.

Through the arm guide box 48, as indicated in FIGS. 17 and 18, an arm 61 may advance and retreat in a horizontal direction under the engaging relationship between a rack 62 and a pinion 63. In other words, a pair of shafts 64 and 65 are rotatable within the arm guide box 48, the former 64 bearing a support roller 66 and the latter 65 bearing a support roller 68 and the pinion 63 via a metal plate 67. As noted earlier, the pinion 63 is held in the engaging relationship with the rack 62 secured at one side of the bottom of the arm 61.

A shaft 65 has one end extending out of the arm guide box 48 and carrying a coupling 69 and the other end carrying the coupling 69 and a chain wheel 70. As shown in FIG. 14, the shaft 65 is coupled to the respective arm guide boxes 48 via the coupling 69 and a link shaft 71 and to an arm drive portion 73 affixed to the links 47 via the chain wheel 70 and the chain 72.

With such an arrangement, the arm drive portion 73 moves the arm 61 in a horizontal direction via the pinion 63 and the rack 62 under the engaging relationship.

Figure 19:
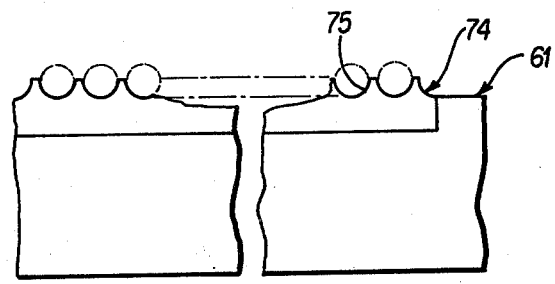
FIG. 19 is an enlarged cross-sectional view of an arm receiving station shown in FIG. 17.

On the top of the arm 61, as indicated in FIGS. 17 and 19, a tube receiving station 74 is detachable and exchangeable which has a multiplicity of recesses 75 at the same pitch P as that of the holes in the end plates and middle plates of the heat exchangers.

Figure 20:
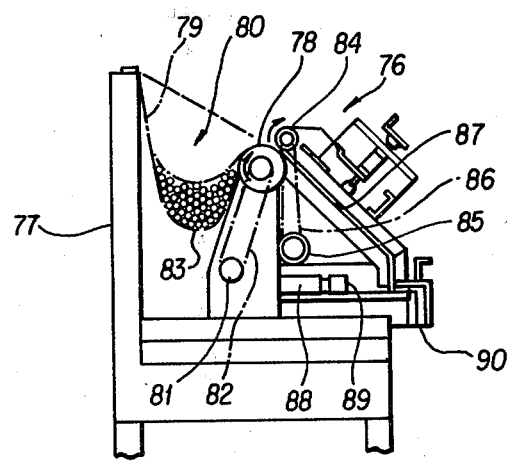
FIG. 20 is a side view of a tube supply station shown in FIG. 1.

The tube supply station 76 is positioned at an elevated level on the arm portion 45. It is clear from FIG. 20 that a plurality of chains 79 are stretched between a frame 77 and rotatable supply rollers 78 with their one end at the top of the frame 77 and their opposite end at the supply roller 78, thereby constituting the storage device. A motor 81 rotates the supply roller 78 in the arrow direction via a convey chain 82 and winds a chain 79 to hoist the tubes in the storage device 80.

On the other hand, a different motor 85 rotates an alignment roller 84 over the supply roller 78 in the arrow direction through a convey chain 86, thus aligning the hoisted tubes and throwing the same into guide slits 87 one by one. The tubes 83 each within a respective one of the guide slits 87 are automatically secured at their tip portions by the nose by an appropriate tool (not shown) and then dispensed one by one from the lower outlet port 90 onto the arm while the thrust rod 89 is moving in a horizontal direction by a cylinder 88.

The following will set forth how to operate the above detailed tube insertion machine 1. FIG. 1 depicts the situation where the elevator 2 is elevated at a level flush with the holes in the uppermost of the heat exchangers by an elevator drive device 91, the gate configuration pusher 3 is retracted at the left extremity via the chain 9 driven by the drive device and the links 47 for the arm portion 45 are moved at an upper level of the prop 46 by operation of the driving motor 58.

Under these circumstances, subsequent to the backward movement of the arm 61 caused by the arm drive device 73 disposed on the links 47, the tubes 83 from the tube supply station 76 are conveyed one by one on the top of the tip portion of the arm 61 as shown in FIG. 21(A) and the arm 61 is moved gradually to the left so that a desired number of the tubes 83 are aligned within the recesses 75 over the guide station 20 as viewed from FIG. 21(B). In this case a proximity switch (not shown) may be disposed at the outlet port 90 of the tube supply station 76 to sense any projection within the recesses 75 in the tube receive portion 74 and operate the cylinder 88.

Thereafter, the driving motor 58 lowers the arm 61 together with the links 47 via the wire as depicted in FIG. 21(C) and the tubes 83 are conveyed from the arm 61 to the grooves 29 and the guide slits 34 in the stationary guide 22 and the rotary guide 23 of the guide station 20. The arm 61 is shifted rightward by the arm drive device 73 as shown in FIG. 21(D) and lifted to its original position together with the links 47 by the driving motor 58.

Once the tubes 83 have been conveyed on the guide station 20, the cylinder 42 operates and the tubes are held at a given interval between the recesses in the stationary guides 22 and the "O" shaped guide portions 35 in the rotary guides 23.

While the gate configuration pusher 3 is moving forward by operation of the drive device 8, the pawls 14 of the thrust heads 7 on the front side portion of the pusher urge the respective tubes 83 forward and the guide station 20 leads the same into the holes in the end and middle plates of the heat exchangers. Upon completion of insertion of the tubes 83 the gate configuration moves backward to its original position under control of the drive device 8 and the elevator 2 moves downward to the second succeeding one of the heat exchangers.

It is understood that, on the top of the arm 61 returning to its elevated level during the forward movement of the gate configuration pusher 3, the tubes 83 are aligned as shown in FIG. 21(B). The tubes 83 are conveyed on the guide station 20 as soon as the gate configuration pusher 3 returns to its original position.

Through the repeated operations the tubes are automatically into the respective holes in the heat exchangers. Since the holes for insertion of the tubes are previously determined, the driving techniques for the respective cylinders can be programmed.

In the event that any of the tubes 83 is engaged with the holes during insertion of the tubes, the corresponding one of the pawls 14 rotates and a limit switch (not shown) at the stroke end of the pawl senses such unusual event to operate the cylinder 13, interrupting insertion of that tube and allowing only the remaining tubes 83 to be inserted. This prevents the tubes from being damaged.

What is claimed is:

1. A tube insertion machine comprising:
   an elevator;
   a plurality of guides mounted on said elevator, and mutually spaced by a predetermined distance, for supporting and guiding tubes for movement in a horizontal first direction, at least some of said guides being rotatable about an axis in a second vertical direction transverse to said first direction and shaped to lock said tubes against movement in said second direction when said guides are in a rotated position; and
   a pusher movable on said elevator in at least said first direction, said pusher including a plurality of pawls adapted to engage said tubes for moving said tubes in said first direction, whereby said tubes may be accurately inserted in a plate spaced from said tubes in said first direction.

2. The machine of claim 1 including hydraulic power cylinder means connected between said elevator and said guides for moving said guides in a horizontal third direction transverse to said first direction.

3. The machine of claim 1 wherein said elevator is movable in said second direction and including arm means mounted on said elevator above said guides, said arm means being movable in said second direction and in a horizontal third direction transverse to said first direction.

4. The machine of claim 1 including first and second means for driving said arm means in said second and third directions respectively, said first means for driving comprising a wire fixed between said arm means and wire driving means, said second means for driving comprising a rack and pinion fixed between a prop portion of said elevator and said arm means.

5. The machine of claim 3 including tube receiving means mounted on top of said arm means.

6. The machine of claim 3 wherein said pawls are pivotable about an axis extending in said third direction and include means for biasing said pawls into contact with said tubes, whereby resistance of said tubes to movement in said first direction, when sufficient to overcome said biasing means, will pivot said pawls.

7. The machine of claim 6 including means for sensing the pivoting of said pawls and means for moving said pawls in said second direction in response to a signal from said sensor means.

* * * * *

UNITED STATES PATENT AND TRADEMARK OFFICE
CERTIFICATE OF CORRECTION

PATENT NO.  :   4,382,329
DATED       :   May 10, 1983
INVENTOR(S) :   Nobuo Takaoka et al It is certified that error appears in the above-identified patent and that said Letters Patent is hereby corrected as shown below:

Please insert on Title Page:

-- Attorney, Agent, or Firm-Oblon, Fisher, Spivak, McClelland & Maier, P.C. --

Signed and Sealed this

Thirteenth Day of September 1983

[SEAL]

*Attest:*

GERALD J. MOSSINGHOFF

*Attesting Officer*   *Commissioner of Patents and Trademarks*